United States Patent
Yoldi Sanguesa et al.

(10) Patent No.: US 10,000,678 B2
(45) Date of Patent: Jun. 19, 2018

(54) ICE-RESISTANT PAINT FOR WIND TURBINE BLADES, PROCEDURE FOR ITS PREPARATION, USE AND WIND TURBINE BLADE COATED WITH THE ICE-RESISTANT PAINT

(71) Applicant: GAMESA INNOVATION & TECHNOLOGY, S. L., Sarriguren (Navarra) (ES)

(72) Inventors: Maria Yoldi Sanguesa, Sarriguren (ES); Almudena Munoz Babiano, Madrid (ES); Olatz Garcia Miguel, Zamudio (ES)

(73) Assignee: GAMESA INNOVATION & TECHNOLOGY, S.L., Sarriguren (Navarra) (ES)

( * ) Notice: Subject to any disclaimer, the term of this patent is extended or adjusted under 35 U.S.C. 154(b) by 0 days. days.

(21) Appl. No.: 14/790,195

(22) Filed: Jul. 2, 2015

(65) Prior Publication Data
US 2016/0009972 A1  Jan. 14, 2016

(30) Foreign Application Priority Data
Jul. 8, 2014 (ES) .................................. 201400546

(51) Int. Cl.
| | | |
|---|---|---|
| *C09K 3/18* | (2006.01) | |
| *C09D 175/04* | (2006.01) | |
| *F03D 80/40* | (2016.01) | |
| *C08K 3/36* | (2006.01) | |

(52) U.S. Cl.
CPC .............. *C09K 3/18* (2013.01); *C09D 175/04* (2013.01); *F03D 80/40* (2016.05); *C08K 3/36* (2013.01); *C08K 2201/011* (2013.01); *F05B 2230/90* (2013.01); *F05B 2280/50* (2013.01); *F05B 2280/6011* (2013.01); *Y02E 10/72* (2013.01); *Y02P 70/523* (2015.11)

(58) Field of Classification Search
CPC ........... C09K 3/18; C08K 3/36; C09D 175/04
See application file for complete search history.

(56) References Cited

U.S. PATENT DOCUMENTS

| | | | | |
|---|---|---|---|---|
| 2008/0190325 A1* | 8/2008 | Kohler | ................... | B82Y 30/00 106/499 |
| 2014/0010961 A1* | 1/2014 | Sorondo Zabala | ... | F03D 1/0675 427/290 |
| 2014/0208978 A1* | 7/2014 | Sunder | ................... | B82Y 30/00 106/2 |
| 2015/0118501 A1* | 4/2015 | Lu | .......................... | C09D 5/024 428/424.6 |

FOREIGN PATENT DOCUMENTS

| | | |
|---|---|---|
| ES | 2 230 913 T3 | 5/2005 |
| GB | 2463675 A | 3/2010 |

OTHER PUBLICATIONS

Espacenet English abstract of WO 0034651 A1 which corresponds to ES 2 230 913 T3.

* cited by examiner

*Primary Examiner* — Michael L Leonard
(74) *Attorney, Agent, or Firm* — Ladas & Parry LLP

(57) ABSTRACT

Ice-resistant paint comprising an ice-resistant base component that in turn comprises a main component entailing a high solid paint with a synthetic polyurethane-based binding component dissolved in a main organic solvent, and a hydrophobe component consisting of hydrophobic ice-resistant functional nanoparticles selected from among nanoparticles functionalized with a polymer and nanoparticles functionalized in sol-gel, where the ice-resistant paint comprises a mixture of the main component with a dispersion of functional nanoparticles dispersed in a dispersing composition constituting the main solvent and a dispersant, and forms a base matrix, where the dispersing composition and functional nanoparticles form a dispersion of nanoparticles in which the functional nanoparticles are in the base matrix, and the dispersion of dispersing nanoparticles mixed with the main component to form an ice-resistant base component of the ice-resistant paint.

18 Claims, No Drawings icle-RESISTANT PAINT FOR WIND
TURBINE BLADES, PROCEDURE FOR ITS
PREPARATION, USE AND WIND TURBINE
BLADE COATED WITH THE
ICE-RESISTANT PAINT

FIELD OF THE INVENTION

The present invention pertains to the technical field of industrial coatings for wind turbine components and, particularly, ice-resistant paints for wind turbine blades.

BACKGROUND OF THE INVENTION

The aerodynamic characteristics of wind turbine blades are essential to wind turbine performance. During cold seasons and in cold climates, the outer surfaces of the blades are exposed to ice formation. The accumulation of ice, particularly on the leading edge area, has negative and even substantial effects on the aerodynamic qualities of the blade, since it affects not only the energy performance of the wind turbine but also rotor structural loads by generating vibrations and imbalance in a running wind turbine, and consequently greater wear on components. Extreme ice accumulation, could even cause a forced shutdown, since the blades on a rotor, normally three, must be balanced in terms of weight and, therefore, if ice accumulation compromises the integrity of this balance, the wind turbine must stop to prevent damages caused by imbalance in the mechanical part of the wind turbine. The significant speed and height of the iced blades likewise entails a danger as chunks of ice already formed on the blades could detach and fall at an elevated speed.

A diversity of systems have been conceived to deal with the formation of ice on wind turbine blades such as active and passive ice-resistant and de-icing systems.

One passive ice-resistant system entails coating the blades with ice-resistant paint such as a fluoroethane-based black paint to absorb thermal energy during the day and release it at night, thus heating the blade surface and contributing to the prevention of ice formation to a certain degree. However, the effectiveness of paints of this sort is extremely limited, particularly in very cold climates or on very short winter days.

Hydrophobes are another type of ice-resistant paints. They block water adhesion to the blade surface and, consequently, preclude ice formation. This sort of paint, however, tends to become porous over time, losing its hydrophobic properties, and thus requires reconditioning after a given period, resulting in high costs not only due to the short useful service life but also because the wind turbine must shut down during the corresponding work. Moreover, an increase in hydrophobicity leads to a reduction in adhesion forces, which could result in paint adhesion issues on the blade surface.

Ice-resistant paints for wind turbine blades are described, for instance, in ES2230913T3 and GB2463675A.

Further, high solid paints ("HS Paints") are also commonly used to paint wind turbine blades. HS paints have two components, namely a polyurethane-based primer, i.e., mixtures essentially comprising synthetic polyurethane resins, organic solvents and pigments, with a content in solids >70% by mass, low density (1.2-1.4 g/cm$^3$), and a content in volatile organic compounds (VOC)<300 g/l; and a second isocyanate-based hardener component that mixes with the primer component before painting the blades. Paints obtained in this manner are cured and dried in the open air, and create coatings that satisfy the strictest requirements regarding the stability of gloss and color, even in extreme climates. They are also highly elastic, resistant to weather and abrasion caused by, for instance, wind and/or rain, scratches, solvents, agents, hydraulic oils, etc., and are thus widely employed in paints used for coating wind turbine blades. Nonetheless, the hydrophobic properties of these paints are limited, and they are thus ineffective against the formation of ice.

Such high solid paints are sold on the market by, for example, the German companies BASF COATINGS GMBH (RELEST® line) and MANKIEWICZ GEBR. & CO. (ALEXIT® line).

It would thus be desirable to obtain a paint having properties tending to avert the formation of ice on wind turbine blades without compromising the resistance to the physical and chemical agents as conferred by conventional paints employed as wind turbine blade coatings, and particularly resistant to UV radiation and erosion, insofar as erosion caused by particles and rain.

DESCRIPTION OF THE INVENTION

The purpose of the present invention is to overcome the aforementioned drawbacks in the current state of the art through the use of a new ice-resistant paint for wind turbine blades, a procedure to create this ice-resistant paint, the use thereof, and a blade at least partially coated by this ice-resistant paint.

The ice-resistant paint according to the invention comprises an ice-resistant base, which in turn comprises a main component of a high solid paint, which could be conventional per se, with a synthetic polyurethane resin-based binding component dissolved in a main organic solvent and a hydrophobe component, which comprises hydrophobic ice-resistant functional nanoparticles selected from among nanoparticles functionalized with a polymer and nanoparticles functionalized in sol-gel, the ice-resistant paint characterized because the ice-resistant paint comprises a mixture of a main component with a dispersion of disperse functional nanoparticles in a dispersing mixture of a main solvent and a dispersant, the dispersing composition forms a base matrix;

the dispersing composition and the functional nanoparticles form a dispersion of nanoparticles in which the functional nanoparticles are in the base matrix;

the dispersion of dispersant nanoparticles is mixed with the main component, forming an ice-resistant base component of the ice-resistant paint.

The present description employs the following terms as defined below:

Main component: Paint component with no functional nanoparticles;

Main component: high solid paint component comprising, conventionally per se, the binder component dissolved in a main solvent;

Main solvent: Main solvent present in the main component;

Functional nanoparticles: ice-resistant functional nanoparticles selected among the nanoparticles functionalized with a polymer and nanoparticles functionalized in sol-gel, so that they are ice-resistant and hydrophobic;

Dispersing composition: composition comprising the solvent and dispersant forming the base matrix for the functional nanoparticles;

Nanoparticle dispersion: dispersion comprising the functional nanoparticles on the base matrix;

Ice-resistant base component: mixture comprising the main component and the nanoparticle dispersion—when the ice-resistant paint is of a single component, the term "ice-resistant base component" is equivalent to "ice-resistant paint", though when the ice-resistant paint is of at least two components the "ice-resistant base component" corresponds to the main component.

The ice-resistant paint, when of the two-component sort, comprises, in addition to the ice-resistant base component as the main component, a hardener component selectable from among hardener agents based on isocyanates, polycyanates and combinations thereof, as a secondary component.

The fact that, according to the invention, the ice-resistant functional nanoparticles have been dispersed previously in the dispersing composition forming the base matrix that has a composition at least similar to the main component of the high solid paint, permits the introduction, dispersion and distribution of ice-resistant functional nanoparticles in the main component much more uniformly and effectively than when functional nanoparticles are introduced directly into the main component, so that the ice-resistant paint according to the invention conserves the physical-chemical properties of a conventional paint employed to coat wind turbine blades, especially the resistance to erosion and ultraviolet radiation, guaranteeing the same durability and resistance to ageing as the original paint. Thus, the dispersing formula acts as a "Trojan Horse" for the functional nanoparticles, enabling the dispersion of functional nanoparticles in the main component of the high solid paint.

The dispersing solution (dispersant) can comprise the main solvent and the surfactant in a proportion of 2:1, preferentially 3:1 by mass; dispersant is 2-3.5% in weight respect nanoparticles mass and nanoparticle is 20-30% in weight respect solvent.

The ice-resistant base component can comprise the nanoparticle dispersion at 4-6% by mass of functional nanoparticles.

When this is a two-component paint in which the main component is a conventional high-solid paint, the ice-resistant base component can be mixed with the hardener agent so that the final ice resistant paint has approximately 2-3% of functional nanoparticles.

The main solvent can be selected from among alcohol-based or organic-based solvents, common per se in their polyurethane chemical makeup such as butyl acetate, ethyl acetate, 1-methoxy-2-propanol acetate, toluene, xylene, naphtha solvent, 1,4-dioxane, diacetone alcohol, N-methylpyrrolidone, dimethylacetamide, dimethylformamide, dimethyl sulfoxide, or discretional mixtures thereof. According to the invention, the main solvent could be an organic compound with average polarity, preferentially n-butyl-acetate, since the latter is the most common in conventional polyurethane resin-based high solid paints for wind turbine blades. Such conventional polyurethane resin-based paints are sold on the market by, for example, the German companies BASF COATINGS GMBH (RELEST® line, e.g., RELEST WIND 1306) and MANKIEWICZ GEBR. & CO. (ALEXIT® line, for instance, ALEXIT 495-498).

The dispersant in the dispersing composition could be a polymeric dispersant in non-polar systems such as an amphiphilic polymeric dispersant, e.g., polymeric dispersant in non-polar systems.

In one embodiment of the invention, the dispersant is a cationic polymeric dispersant that can comprise a mixture of alkyl esters, fatty acids and alkylamines. Suitable dispersants for this type are, for example, those pertaining to the HYPERMER KD-3 line sold on the market by the British company CRODA INTERNATIONAL, PLC.

The ice-resistant functional nanoparticles contained in the ice-resistant paint according to the invention are hydrophobic nanoparticles, preferentially inorganic, that can bear hydrophobic groups on its surface, particularly composed of organofunctional silicon compounds that have at least one functional group that reacts with the hydrophilic groups of the inorganic hydrophilic nanoparticles and at least one hydrophobic radical.

Some examples of inorganic hydrophilic nanoparticles used for creating ice-resistant functional nanoparticles are based on the oxides and/or mixed oxides, including hydrated oxides of at least one metal or semi-metal from the main groups two and six, and transition groups one to eight in the Periodic Table of Elements, or even lanthanides, especially oxides and/or mixed oxides, including hydrated oxide, selected within the group from the elements Si, Al, Ti, Zr, and/or Ce. Examples of such inorganic hydrophilic nanoparticles include nanoparticles based on $SiO_2$, e.g., silica prepared pyrogenically or colloidally, silicates, $Al_2O_3$, aluminum hydroxide, aluminosilicates, $TiO_2$, titanates, $ZrO_2$, or zirconates, $CeO_2$.

As compounds with hydrophobic groups, the use of functional organic silicon compounds is particularly preferential, since it has at least one alkyl group having from 1 to 50 carbon atoms, particularly 1 to 10 carbon atoms, and at least one hydrolyzable group and/or at least one OH group and/or one NH group. Examples of compounds having hydrophobic groups include alkylalkoxysilanes, particularly dialkyldialkoxysilanes, and alkyltrialkoxysilanes, preferentially trialkylchlorosilanes and dialkylchlorosilanes, alkylpolysiloxanes, dialkylpolysiloxanes, alkyldisiloxanes and similar.

Likewise suitable as compounds for having hydrophobic groups are the various monomeric and/or oligomeric silicic esters that have methoxy, ethoxy or n-propoxy and/or isopropoxy groups, and a degree of oligomerization from 1 to 50, particularly from 2 to 10, preferentially from 3 to 5.

As compounds that have hydrophobic groups, the use of dimethyldichlorosilane and/or hexamethyldichlorosilane and/or octyltriethoxysilane and/or dimethylpolysiloxane is particularly preferential. The particularly preferred hydrophobic nanoparticles are nanoparticles based on the reaction products of $SiO_2$ and dimethyldichlorosilane and hexamethyldisilazane, particularly reaction products of $SiO_2$ and dimethyldichlorosilane. Examples of hydrophobic nanoparticles that can be used are commonly sold products by the German company EVONIK INDUSTRIES, under the trademark AEROSIL®, particularly AEROSIL® 8200, R106, R202, R972, R972V, R974, R974V, R805 or R812; or the company WACKER CHEMIE AG, under the trademark or brand HDK, particularly HDK H15, H 18, H20, H30 or 2000.

In a preferred embodiment of the ice-resistant paint,
the main solvent is n-butyl-acetate;
the dispersant composition in which the ice-resistant functional nanoparticles are dispersed comprises a cationic dispersant, which in turn comprises a mixture of alkyl esters, fatty acids and alkylamines;
the ice-resistant functional nanoparticles are pyrogenic silica nanoparticles functionalized with dimethyldichlorosilane or hexamethyldisilazane.

The ice-resistant functional nanoparticles in the ice-resistant base component preferentially have an average particle size of between 100 nm and 300 nm; and more preferentially, their size is between 150 nm and 280 nm.

The average particle sizes and their distribution in the ice-resistant base component are determined by Laser Doppler velocimetry. The size distribution of the particles in dispersion can be determined with a system, namely the Z-SIZER NANO ZS90 manufactured by MALVERN. Glass cuvettes are used to conduct these measurements. Three samples are prepared for each suspension, and each one is then measured, calculating the average of the values. Prior tests have determined a suspension concentration of 0.1% by mass so that equipment measurements are reliable. The values for $Z_{average}$ and PdI (polydispersity index) are measured.

$Z_{average}$ is the Z-average size or Z-average mean. It is a parameter used in dynamic light scattering, also known as the cumulants mean. It is the main parameter and most stable produced by the technique. It is the best value for reporting in quality control studies as defined by standards ISO 13321 and ISO 22412, the latter defines the $Z_{average}$ value as "the harmonic intensity averaged particle diameter."

The PdI value indicates the degree of variation or amplitude of a Gaussian bell curve representing the distribution of the particle sizes.

The procedure for obtaining an ice-resistant paint according to the invention entails identifying the base component of the high solid paint upon which the ice-resistant paint will be based, and preparing the ice-resistant base component through a first stage that entails mixing the surfactant with the main solvent to obtain the dispersing composition in a ratio of 1/3 a second stage that entails mixing the dispersing composition with the functional nanoparticles to obtain a dispersion of nanoparticles comprising 20-30% by mass, preferentially 25% by mass, of functional nanoparticles.

a third stage that entails mixing and homogenizing the dispersion of nanoparticles with the main component for obtaining the ice-resistant base component with a functional nanoparticle content of 4% to 6% by mass, preferentially 5% by mass, in which the nanoparticles have an average particle size of between 100 nm and 300 nm, preferentially from 150 nm to 280 nm.

The procedure for obtaining a two-component ice-resistant paint also entails a fourth stage that involves mixing the ice-resistant base component with the standard hardener component according to the indications of the manufacturer. The nanoparticles remain in a proportion of 2-3% by weight regarding the paint.

This procedure enables the generation of a standard paint for wind turbine blades with ice-resistant properties, maintaining their remaining physical-chemical properties and durability intact.

In one preferential embodiment of this procedure, the main solvent is n-butyl-acetate, the dispersant is a cationic dispersant comprising a mixture of alkyl esters, fatty acids and alkylamines, and the nanoparticles functionalized with pyrogenic silica nanoparticles functionalized with hexamethyldisilazane or dimethyldichlorosilane.

These pyrogenic silica nanoparticles functionalized with hexamethyldisilazane (HMDS) are hydrophobic and have a spherical shape of 8 to 30 nm in diameter. Pyrogenic silica is a hydrophilic compound of very fine $SiO_2$ particles with a specific surface of 110 and 220±20 m2/g. The size distribution of the particles of a typical silica fume is <0.5 micras, with an median diameter generally between 0.1 and 0.2 micras Hexamethyldisilazane (HMDS) is an organosilicone compound, hydrophobe with a molecular structure of $[(CH_3)_3Si]_2NH$ polymerized on the silica nanoparticles, which are hydrophilic by their chemical nature, to convert them into hydrophobic molecules. They are known as "core-shell" particles: the silica nanoparticle is the core, which converts the shape and base properties, and the HMDS is the shell, which confers the surface properties to the functionalized nanoparticle.

This type of functionalized nanoparticles is commercially available, for example, under the EVONIK INDUSTRIES trademarks of AEROSIL 300, AEROSIL R812 and AEROSIL R972. For example, AEROSIL R812 has a specific BET surface of 110+20 $m^2$/g and an average particle size of approximately 25 nm.

For its application onto the wind turbine blade, the ice-resistant base component can be mixed with a hardener component selected from among the hardener agents per se conventional and based on isocyanates, polyisocyanates and combinations thereof.

The invention also refers to the use of the ice-resistant paint described above for coating at least one part of a wind turbine blade. Only parts of the blade could be coated such as, for instance, the parts most exposed to cold temperatures such as the leading edge and/or their radial edge, or the entire blade could be fully coated.

Likewise the invention refers to a wind turbine blade that is partially or fully coated by ice-resistant paint described above.

The ice-resistant paint according to the present invention has proven to present properties better than those of conventional polyurethane high solid paints, since it not only confers hydrophobic properties but also resistance to erosion and ageing. It should necessarily be so in order to be utilized on wind turbines with no need for re-certification. Regarding color, gloss, strength, flexibility, UV resistance, . . . the properties of the ice-resistant paint are similar to the properties of conventional polyurethane-based high solid paints, though the greater advantage is that the ice-resistant paint, according to the present invention, in addition to the ice-resistant effect conferred because of the reduced surface energy, also confers a resistance to erosion better than conventional polyurethane-based high solid paints, where resistance to erosion is one of the most important properties for the blades of a wind turbine because it directly affects performance (erosion modifies the aerodynamic profile of the blade and lowers performance), and because it directly affects maintenance costs, since the wind turbine must be stopped to repaint the blades in the event of this erosion.

MODES OF CARRYING OUT THE INVENTION

Example 1

A conventional polyurethane high solid paint was selected (RELEST line e.g. RELEST WIND 1306) as the main component, identifying the main solvent in this paint as n-butyl-acetate, A dispersing composition was prepared by mixing, with a magnetic agitator, 880 g (1 l) of n-butyl-acetate as solvent and 293.3 g HYPERMER KD3 as surfactant according to 3:1 relation.

The final nanoparticle dispersion was prepared by mixing 29.85 g of AEROSIL R972 (pyrogenic silica nanoparticles functionalized with DDS), 4.2 g of dispersing solution, and 132.6 ml of n-butyl-acetate and both components were mixed by ultrasonic agitation to yield 135.7 ml of a nanoparticle dispersion at 25% of AEROSIL R972.

135.7 ml of nanoparticle dispersion was mixed by mechanical agitation with 1 liter of the main component (based paint+hardener) to yield 1.340 l of ice-resistant base component with a 5% by mass of AEROSIL R972.

The main component is prepared with 778 ml of based paint and 222 ml of hardener according to the relation 3.5:1 (volume). Relating to ice-resistance, base component base paint (778 ml) is mixed with 105.6 ml of nanoparticle dispersion. 320 g of the ice-resistant base component was mixed by mechanical agitation with 100 g of a hardener agent (polyisocyanate 1385 ALEXIT 498 from BASF COATINGS GMBH.) to yield an ice-resistant paint according to the invention with an average particle size between 150 and 200 nm, approximately 65% from 180 to 190 nm, a Zaverage value of 185 nm, and a degree of polydispersion of 0.150.

Example 2

The ice-resistant paint prepared as described in the preceding example and the conventional polyurethane and polyisocyanate-based high solid paint were applied to respective laminates of conventional material employed on wind turbine blades, and then tested to ascertain their properties of color, opacity, gloss, adhesion, abrasion, oxidation, cracking and delamination, resistance to rain erosion and ice-resistant properties. The following table lists the results of the tests:

TABLE I

| Property | Requirement Category | Test method | Conventional painting | Ice-resistant paint | Comparison |
|---|---|---|---|---|---|
| Color | Physical properties | ISO 7224 (<1.5) | ΔE = 0.38 | ΔE = 0.48 | OK |
| Opacity | Cured coating | ISO 2814 | 150 μm | 150 μm | OK |
| Gloss | | ISO 2813 (<30) | 4.62 GU | 3.86 GU | OK |
| Adhesion | Physical-chemical | ISO 4624 (>5) | 7.13 MPa | 6.93 MPa | OK |
| Rain erosion test | properties | SAAB test | PASS | PASS | Much better, Strength more than doubled |
| Erosion testing | | ASTM G76 | 0.04 g/300 s | 0.04 g/300 s | OK |
| Abrasion | | ISO 4628-2 | 0 s (0) | 0 s (0) | OK |
| Oxidation | | ISO 4628-3 | Ri 0 | Ri 0 | OK |
| Cracking | | ISO 4628-4 | 0 s (0) | 0 s (0) | OK |
| Delamination | | ISO 4628-5 | 0 s (0) | 0 s (0) | OK |
| ANTI-ICING EFFECT | Functional properties | WCA | WCA 102-120° | WCA 102.4°-120 (124° after erosion tests) | Better |
| | | Water evacuation | Water retention: 0.053 | Water retention: 0.019 | Better 65% increase in water evacuation |
| | | Freezer tunnel | −10° C. ice adhered | −10° C. no ice adhered | Much better |

Example 3

The ice-resistant paint and conventional polyurethane and polyisocyanate-based high solid paint were applied to respective laminates of conventional material employed on wind turbine blades, and then underwent rain erosion testing with SAAB testing methods in the following conditions:

Rainmaking devices: 6

Precipitation (mm/h): 25.5

Drop diameter (mm): 2

Impact angle (degrees): 90

Rotational speed (rpm): 767.9

The following table lists the results of these tests:

TABLE II

| Sample | Sample condition | Test No. | Time and erosion test (min) |
|---|---|---|---|
| Conventional painting | recently painted | 1 | 6 |
| | recently painted | 2 | 6 |
| | recently painted | 3 | 7 |
| | after NORSOK ageing | 1 | 5 |
| | after NORSOK ageing | 2 | 6 |
| | after NORSOK ageing | 3 | 6 |
| Ice-resistant paint | recently painted | 1 | 20 |
| | recently painted | 2 | 20 |
| | recently painted | 3 | 15 |
| | after NORSOK ageing | 1 | 7 |
| | after NORSOK ageing | 2 | 7 |
| | after NORSOK ageing | 3 | 7 |

As the test results reveal, the samples coated with the ice-resistant paint according to the invention resist erosion from rain substantially better than the samples with conventional paint, which demonstrates greater resistance than conventional paint.

The invention claimed is:

1. An ice-resistant paint produced by a process comprising the steps of:
   (a) providing a main component which is a high solids paint component comprising a polyurethane resin and a first portion of a main organic solvent, wherein the high solids paint component has a solids content that is greater than 70% by mass, a density between 1.2-1.4 g/cm$^3$ and a content of volatile organic compounds (VOC) below 300 g/l, and wherein the main component does not comprise functional nanoparticles
   (b) providing a dispersing component comprising a second portion of the main organic solvent, a dispersant and a plurality of nanoparticles that are functionalized so that they are ice-resistant and hydrophobic, said nanoparticles being dispersed in the dispersion and comprising 20-30% by weight in respect of the second portion of the main organic solvent, said dispersant being present in the dispersing component in an amount of 2-3.5% by weight of the nanoparticles; and
   (c1) mixing the dispersing component with the high solids paint component to form the ice resistant paint comprising between 4-6% of the nanoparticles, or (c2)

mixing the dispersing component with the high solids paint component and with a hardener to form the ice resistant paint comprising about 2-3% by weight of the nanoparticles.

2. The ice-resistant paint according to claim 1, wherein the main organic solvent is selected from the group consisting of alcohol-based and organic-based solvents.

3. The ice-resistant paint according to claim 2, wherein the main organic solvent is selected from the group consisting of butyl acetate, ethyl acetate, 1-methoxy-2-propanol acetate, toluene, xylene, naphtha solvent, 1,4-dioxane, diacetone alcohol, N-methylpyrrolidone, dimethylacetamide, dimethylformamide, dimethyl sulfoxide, and combinations thereof.

4. The ice-resistant paint according to claim 3, wherein the main organic solvent is n-butyl-acetate.

5. The ice-resistant paint according to claim 1, wherein the dispersant is a polymeric dispersant in non-polar systems.

6. The ice-resistant paint according to claim 1, wherein the functional ice-resistant nanoparticles bear hydrophobic groups on their surface and comprise inorganic nanoparticles with hydrophilic groups.

7. The ice-resistant paint according to claim 6, wherein the hydrophobic groups are selected from the group consisting of:
   (a) organofunctional silica compounds having at least one alkyl group with 1 to 50 carbon atoms, and at least one functional group, and
   (b) monomeric silicic esters, and oligomeric silicic esters having methoxy, ethoxy, n-propoxy groups, and iso-propoxy groups.

8. The ice-resistant paint according to claim 6, wherein the nanoparticles that are products of the reaction of $SiO_2$ and an ester selected from the group consisting of dimethyldichlorosilane and hexamethyldisilazane.

9. The ice-resistant paint according to claim 4, wherein the dispersing component comprises a cationic dispersant that contains a mixture of alkyl esters, fatty acids and alkylamines; and
   the nanoparticles are pyrogenic silica nanoparticles functionalized with an ester selected from the group consisting of dimethyldichlorosilane and hexamethyldisilazane.

10. The ice-resistant paint according to claim 1, wherein the ice-resistant functional nanoparticles have an average particle size of between 100 nm and 300 nm.

11. The ice-resistant paint according to claim 5, wherein the dispersant is a cationic polymeric dispersant comprising a mixture of alkyl esters, fatty acids, and alkylamines.

12. The ice-resistant paint according to claim 7, wherein the at least one functional group is selected from the group consisting of dialkyldialkoxysilanes, alkyltrialkoxysilanes, trialkylchlorosilanes, dialkylchlorosilanes, alkylpolysiloxanes, dialkylpolysiloxanes and alkyldisiloxanes.

13. The ice-resistant paint according to claim 7, wherein the hydrophobic groups are selected from the group consisting of dimethyldichlorosilane, hexamethyldichlorosilane, octyltriethoxysilane, and dimethylpolysiloxane.

14. The ice-resistant paint according to claim 1, comprising the hardener.

15. The ice-resistant paint according to claim 14, wherein the hardener comprises a compound selected from the group consisting of an isocyanate, a polyisocyanate and a combination thereof.

16. A method of coating at least one part of a wind turbine blade, comprising the steps of:
   (a) providing a main component which is a high solids paint component comprising a polyurethane resin and a first portion of a main organic solvent, wherein the high solids paint component has a solids content that is greater than 70% by mass, a density between 1.2-1.4 $g/cm^3$ and a content of volatile organic compounds (VOC) below 300 g/l, and wherein the main component does not comprise functional nanoparticles;
   (b) providing a dispersing component comprising a second portion of the main organic solvent, a dispersant and a plurality of nanoparticles that are functionalized so that they are ice-resistant and hydrophobic, said nanoparticles being dispersed in the dispersing component, wherein the nanoparticles are present in the dispersing component in an amount of 20-30% by weight in respect of the second portion of the main organic solvent and wherein the dispersant is present in the dispersing component in an amount of 2-3.5% by weight of the nanoparticles;
   (c1) mixing the dispersing component with the high solids paint component to form an ice resistant paint comprising between 4-6% by weight of the nanoparticles or
   (c2) mixing the dispersing component with the high solids paint component and with a hardener to form the ice resistant paint comprising about 2-3% by weight of the nanoparticles; and
   (d) applying the ice resistant paint to the at least one part of the wind turbine blade.

17. The method according to claim 16, wherein step (c2) is present and the hardener comprises a compound selected from the group consisting of an isocyanate, a polyisocyanate and a combination thereof.

18. A method of making an ice resistant paint, comprising the steps of:
   (a) providing a main component which is a high solids paint component comprising a polyurethane resin and a first portion of a main organic solvent, wherein the high solids paint component has a solids content that is greater than 70% by mass, a density between 1.2-1.4 $g/cm^3$ and a content of volatile organic compounds (VOC) below 300 g/l, and wherein the main component does not comprise functional nanoparticles;
   (b) providing a dispersing component comprising a second portion of the main organic solvent, a dispersant and a plurality of nanoparticles that are functionalized so that they are ice-resistant and hydrophobic, said nanoparticles being dispersed in the dispersing component, wherein the nanoparticles are present in the dispersing component in an amount of 20-30% by weight in respect of the second portion of the main organic solvent and wherein the dispersant is present in the dispersing component in an amount of 2-3.5% by weight of the nanoparticles;
   (c1) mixing the dispersing component with the high solids paint component to form an ice resistant paint comprising between 4-6% by weight of the nanoparticles or
   (c2) mixing the dispersing component with the high solids paint component and with a hardener to form the ice resistant paint comprising about 2-3% by weight of the nanoparticles.

* * * * *